US011835367B2

(12) United States Patent
Schmitz et al.

(10) Patent No.: US 11,835,367 B2
(45) Date of Patent: Dec. 5, 2023

(54) METHOD FOR COMMUNICATION BETWEEN A TERMINAL AND A MOBILE DATA COLLECTOR VIA A SHORT-RANGE RADIO RECEIVER, AND SHORT-RANGE RADIO RECEIVER

(71) Applicant: DIEHL METERING SYSTEMS GMBH, Nuremberg (DE)

(72) Inventors: Stefan Schmitz, Nuremberg (DE); Achim Schmidt, Weissenohe (DE); Petra Joppich-Dohlus, Rathsberg (DE); Thomas Blank, Merkendorf (DE)

(73) Assignee: Diehl Metering Systems GmbH, Nuremberg (DE)

( * ) Notice: Subject to any disclaimer, the term of this patent is extended or adjusted under 35 U.S.C. 154(b) by 259 days.

(21) Appl. No.: 16/994,845

(22) Filed: Aug. 17, 2020

(65) Prior Publication Data
US 2021/0048313 A1 Feb. 18, 2021

(30) Foreign Application Priority Data

Aug. 16, 2019 (DE) .............................. 102019005736

(51) Int. Cl.
*G01D 4/00* (2006.01)
*H04W 4/80* (2018.01)
*H04Q 9/02* (2006.01)

(52) U.S. Cl.
CPC ............. *G01D 4/004* (2013.01); *G01D 4/006* (2013.01); *H04Q 9/02* (2013.01); *H04W 4/80* (2018.02);
(Continued)

(58) Field of Classification Search
CPC .......... G01D 4/004; G01D 4/006; H04Q 9/02; H04Q 2209/40; H04Q 2209/60;
(Continued)

(56) References Cited

U.S. PATENT DOCUMENTS 6,931,445 B2 * 8/2005 Davis ................ H02J 13/00002
709/224
7,119,698 B2 * 10/2006 Schleich ............. G01M 3/2807
73/40
(Continued)

FOREIGN PATENT DOCUMENTS

DE 102018004828 A1 3/2019
DE 102018003511 A1 10/2019

OTHER PUBLICATIONS

Communication systems for meters and remote reading of meters—Part 4: Wireless meter readout (Radio meter reading for operation in SRD bands); German version EN 13757-4:2013, DIN EN 13757-4:2014-02, Date: Feb. 2014, pp. 74.
(Continued)

*Primary Examiner* — Amine Benlagsir
(74) *Attorney, Agent, or Firm* — Laurence A. Greenberg; Werner H. Stemer; Ralph E. Locher

(57) ABSTRACT

Communication between a terminal, such as a consumption meter, installed at a fixed location and a mobile data collector, by way of Wireless M-Bus, via a short-range radio receiver. Data from the terminal is forwarded to the data collector via a bidirectional WPAN interface. The terminal sends a message periodically and unprompted for the communication set-up and subsequently opens a reception window after a period of time. In response, a command or a command sequence is conveyed from the mobile data collector to the receiver and to the terminal in one or more reception windows. The receiver determines the reception time at which the message arrives at the receiver, and the receiver stipulates the time at which the command or command sequence is transmitted onward to the terminal, so that the command or command sequence is received by the
(Continued)

terminal within one reception window or multiple reception windows.

16 Claims, 5 Drawing Sheets

(52) U.S. Cl.
CPC ..... *H04Q 2209/40* (2013.01); *H04Q 2209/60* (2013.01); *H04Q 2209/826* (2013.01)

(58) Field of Classification Search
CPC ......... H04Q 2209/826; H04Q 2209/43; H04Q 2209/50; H04Q 2209/883; H04Q 9/00; H04W 4/80; Y02B 90/20; Y04S 20/30
See application file for complete search history.

(56) References Cited

U.S. PATENT DOCUMENTS

| | | | |
|---|---|---|---|
| 2005/0068194 A1* | 3/2005 | Schleich | H04Q 9/00 340/870.02 |
| 2006/0031180 A1* | 2/2006 | Tamarkin | G01D 4/004 705/412 |
| 2006/0202855 A1* | 9/2006 | Salazar Cardozo | H04Q 9/00 340/870.02 |
| 2010/0007521 A1 | 1/2010 | Cornwall | |
| 2013/0121384 A1* | 5/2013 | Prince | H04L 12/2803 375/257 |
| 2014/0028465 A1* | 1/2014 | Cornwall | G01D 4/002 340/870.02 |
| 2014/0247139 A1* | 9/2014 | Bocaletto | G01F 15/063 340/870.02 |
| 2016/0080837 A1* | 3/2016 | Cornwall | H04Q 9/00 340/870.02 |
| 2019/0089738 A1* | 3/2019 | Redding | H04L 63/04 |
| 2019/0334816 A1 | 10/2019 | Joppich-Dohlus et al. | |
| 2019/0387289 A1 | 12/2019 | Petkov et al. | |
| 2020/0313798 A1* | 10/2020 | Hald | H04W 12/041 |

OTHER PUBLICATIONS

Michael Rac GmbH / Ansbach / Germany / 2008 . . . 2019, The MBWBLUE, Radio receiver with Bluetooth interfac, Email: mrg@michaelrac.com, pp. 77.

* cited by examiner

METHOD FOR COMMUNICATION BETWEEN A TERMINAL AND A MOBILE DATA COLLECTOR VIA A SHORT-RANGE RADIO RECEIVER, AND SHORT-RANGE RADIO RECEIVER

CROSS-REFERENCE TO RELATED APPLICATION

This application claims the priority, under 35 U.S.C. § 119, of German patent application DE 10 2019 005 736, filed Aug. 16, 2019; the prior application is herewith incorporated by reference in its entirety.

BACKGROUND OF THE INVENTION

Field of the Invention

The present invention relates firstly to a method for communication between a terminal installed at a fixed location, in particular a consumption meter, and a mobile data collector via a short-range radio receiver. The communication uses Wireless M-Bus and the receiver sets up a bidirectional interface to the terminal, which is situated in the reception range of the receiver, and transmits the data received from the terminal onward to the data collector via a bidirectional short-range radio interface. The terminal sends a message periodically and unprompted for the purpose of communication set-up and in each case subsequently opens a reception window after a period of time. In response thereto a command or a command sequence is conveyed from the mobile data collector to the receiver as the receiver initially receives the command or the command sequence from the data collector and conveys said command or command sequence to the terminal in one or more reception window(s).

In addition, the present invention relates to a short-range radio receiver with a communication module for Wireless M-Bus having an antenna, a short-range radio module, preferably a WPAN module, a processor, a memory, and a power source, preferably in the form of a battery or a storage battery.

Terminals in a supply network, in particular consumption meters, e.g. for water, heat, gas and electricity, these days usually a so-called M-Bus for communication. The M-Bus allows extensive networking of remote readings from a large number of heat quantity meters, gas meters, water meters and electricity meters from different manufacturers. Comparatively small volumes of data per consumption meter are read at relatively long intervals of time, which places comparatively low demands on the transmission rate and hence also on the power consumption, since meters are normally supplied with electric power by means of a single battery over their entire life. The communication in the M-Bus can be effected either by wire or wirelessly. Wireless M-Bus communication is regulated in more detail in the European standard CEN/TC294 EN13757-4. The Wireless M-Bus permits meters to be read as a mobile data collector drives through the supply area in which the meters are located and collects the meter readings (drive-by reading).

According to EN13757-4, there are different modes of operation for meter reading by radio. Mode T (frequent transmission mode) and mode C (compact mode) are particularly suitable for reading as a data collector drives by. In this instance, the respective terminal or the meter transmits a very short message (usually having a length of 3-8 ms) at intervals of a few seconds, in order to allow the meter reading to be read while the data collector drives by. As soon as the data collector has received a message from the meter, a bidirectional communication structure is set up according to EN13757-4. The problem in this case, however, is that the time taken for setting up communication means that the data collector can drive by the relevant meter only at very low velocity. Otherwise, there is the risk of a communication failing. If the first reception window is not hit, the data collector has no further opportunity to communicate with the meter. This is because the meter resends only after a few seconds, e.g. after 10 seconds. Only then is there again the opportunity for a communication. This is not adequate for a drive-by reading.

The brochure MBWBLUE from Michael Rac GmbH, Ansbach, Germany discloses a portable bidirectional radio transceiver having a Bluetooth® interface for Wireless M-Bus consumption meters. This radio transceiver is used for mobile reception of M-Bus radio consumption meter messages and onward transmission thereof to a portable computer via a Bluetooth interface. To receive data from a consumption meter in what is known as drive-by mode, a bidirectional communication structure is initially set up with a consumption meter that is in range in accordance with the Wireless M-Bus. The radio transceiver sends a configured radio message when it has received a radio message from the relevant consumption meter. The problem with this radio receiver is that for mobile reading of consumption meters there must be an increased likelihood of a message from the radio receiver to the consumption meter also hitting the first reception window thereof. There is an increased likelihood only at a very low drive-by speed, however.

BRIEF SUMMARY OF THE INVENTION

It is accordingly an object of the invention to provide a communication method and a radio receiver which overcome the above-mentioned disadvantages of the heretofore-known devices and methods of this general type and which provides for bidirectional communication between a data collector and consumption meters at higher drive-by velocities.

With the above and other objects in view there is provided, in accordance with the invention, a method for communication between a terminal installed at a fixed location and a mobile data collector, by using the Wireless M-Bus, via a short-range radio receiver, the method comprising:
  establishing with the short-range radio receiver a bidirectional interface to the terminal, which is situated within a reception range of the receiver, and transmitting data received from the terminal onward to the mobile data collector via a bidirectional short-range radio interface;
  sending a message from the terminal periodically and unprompted for setting up a communication and in each case subsequently opening a reception window after a period of time;
  in response, conveying a command or a command sequence from the mobile data collector to the receiver, receiving the command or the command sequence with the receiver, and conveyings the command or command sequence to the terminal in one or more reception windows;
  determining with the receiver a reception time at which the message arrives at the receiver; and
  after having received the command or the command sequence from the data collector, stipulating with the receiver a time at which the command or the command sequence is transmitted onward to the terminal while taking into consideration the reception time, such that the command or the command sequence is received by the terminal within one reception window or multiple reception windows.

According to the invention, there is provision for the short-range radio receiver to determine the reception time at which the message arrives at the receiver and for the receiver, after having received the command or the command sequence from the data collector, to stipulate the time at which the command or the command sequence is transmitted onward to the terminal, such that the command or the command sequence is received by the terminal within one reception window or multiple reception windows. In particular, a command is transmitted in one reception window. This enables the receiver or the data collector to calculate when the next reception window of the terminal will be. The receiver is therefore able to stipulate the transmission of commands from the data collector to the terminal to be precisely on the occasion of the reception windows of the terminal.

To this end, the detected reception time can be transmitted onward from the receiver to the data collector, or the receiver stores the reception time, that is to say does not transmit it onward, and assigns it on reception of a command or a command sequence from the data collector on the basis of an identification (e.g. on the basis of the meter address).

In particular, this affords the opportunity for a command or a command sequence to be received from the receiver by the terminal actually within the reception window that is first opened by the terminal for the message received by the receiver immediately beforehand. This is as it were the "first possible" reception window for set-up of the communication. This results in the advantage that communication set-up can be effected very much earlier than previously, which in turn means that the data collector can move past the relevant terminal at a higher velocity.

Expediently, in addition to the reception time, the receiver also determines the meta data of the message from the terminal and transmits said meta data onward to the data collector. Determination of the meta data is additionally advantageous with reference to the calculation of the position of the reception window of the terminal by the receiver or the data collector.

The meta data can preferably be the signal strength and/or the particular transmission mode, in particular transmission mode T or transmission mode C or a bidirectional submode of these transmission modes, and/or the frame format and/or the command validity period. These meta data, individually or in combination, are advantageous for the calculation of the occasion of the reception window of the terminal by the receiver or data collector.

Accordingly, the receiver or the data collector can take the reception time and the meta data as a basis for determining the occasion of the next reception window.

Expediently, according to the present invention, there may furthermore be provision for the reception time and/or the meta data to be transmitted onward to the data collector together with the first message received by the receiver. The data collector therefore receives this further information very quickly together with the message from the terminal. The data collector, after receiving the information, checks whether there is a command for the relevant terminal in its command buffer. The data collector then produces the data that are needed for performing the command (e.g. application data, encryption of the data on the application layer or transport layer) and sends these data back to the receiver.

Further, the data collector sends the reception time and the meta data, preferably with the aforementioned data, from which the receiver can determine the next reception window.

Alternatively, it is also possible for the data collector itself to calculate the occasion of the reception window of the terminal and to convey said occasion to the receiver. Knowing the reception window, the receiver can send the commands or command frames to the terminal via the primary interface such that the reception window of said terminal is hit. This allows very fast set-up of the communication with the terminal.

According to a further expedient refinement of the present invention, instead of a command or a command sequence, the receiver can initially send a dummy command at the time of the detected reception window. This means that, if the data collector should still need a little more time for producing the genuine command data, the communication can already be set up nevertheless, that is to say that the first reception window(s) of the terminal can be used for setting up the communication. The communication with the terminal by the receiver can be maintained with a dummy command or with dummy commands until "genuine command data" have been produced by the data collector and can be sent to the receiver. From this time onward, the receiver terminates the sending of the dummy commands and replaces them with "genuine commands".

In particular, the transmission of dummy commands over successively opened reception windows can be repeated until the command or the command sequence has been produced by the data collector and can be sent over the next reception window.

Preferably, the dummy command can be produced by the data collector and transmitted to the receiver, or the receiver merely receives an applicable message from the data collector and then generates a dummy command itself.

According to a further expedient refinement, the data collector conveys commands that belong to a command sequence to the receiver with a single message. Further, the short-range radio receiver can convey commands that belong to a command sequence, preferably together with process information, to the data collector with a single message. This allows the extent of the communication via the receiver to be reduced, which allows the information processing in the data collector and in the receiver to be simplified.

Preferably, the period of time within which the terminal opens the reception window after sending the message is switchable such that first a first longer period of time and subsequently a second shorter period of time are generable in the terminal, wherein reception of the first command by the terminal is followed by a switch from the first longer period of time to the second shorter period of time, and the further communication is effected up to the end of the command sequence while retaining the second shorter period of time. This allows performance of a command sequence to be speeded up.

Expediently, the short-range radio receiver is a WPAN receiver, preferably a Bluetooth® receiver or a comparable receiver having a range of up to 100 m, preferably up to 300-500 m.

The method according to the invention allows a bidirectional communication to be set up effectively while the data collector passes the terminal along a route at a velocity of at least 40 km/h, preferably of at least 45 km/h, particularly preferably of at least 50 km/h.

The present invention additionally relates to a short-range radio receiver, preferably a WPAN receiver, particularly preferably a Bluetooth® receiver, according to the preamble of Claim 15. To achieve the object according to the invention, the short-range radio receiver is configured such that it is operable using a method according to at least one of the preceding claims.

Other features which are considered as characteristic for the invention are set forth in the appended claims.

Although the invention is illustrated and described herein as embodied in a method for communication between a terminal and a mobile data collector via a short-range radio receiver, and a short-range radio receiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
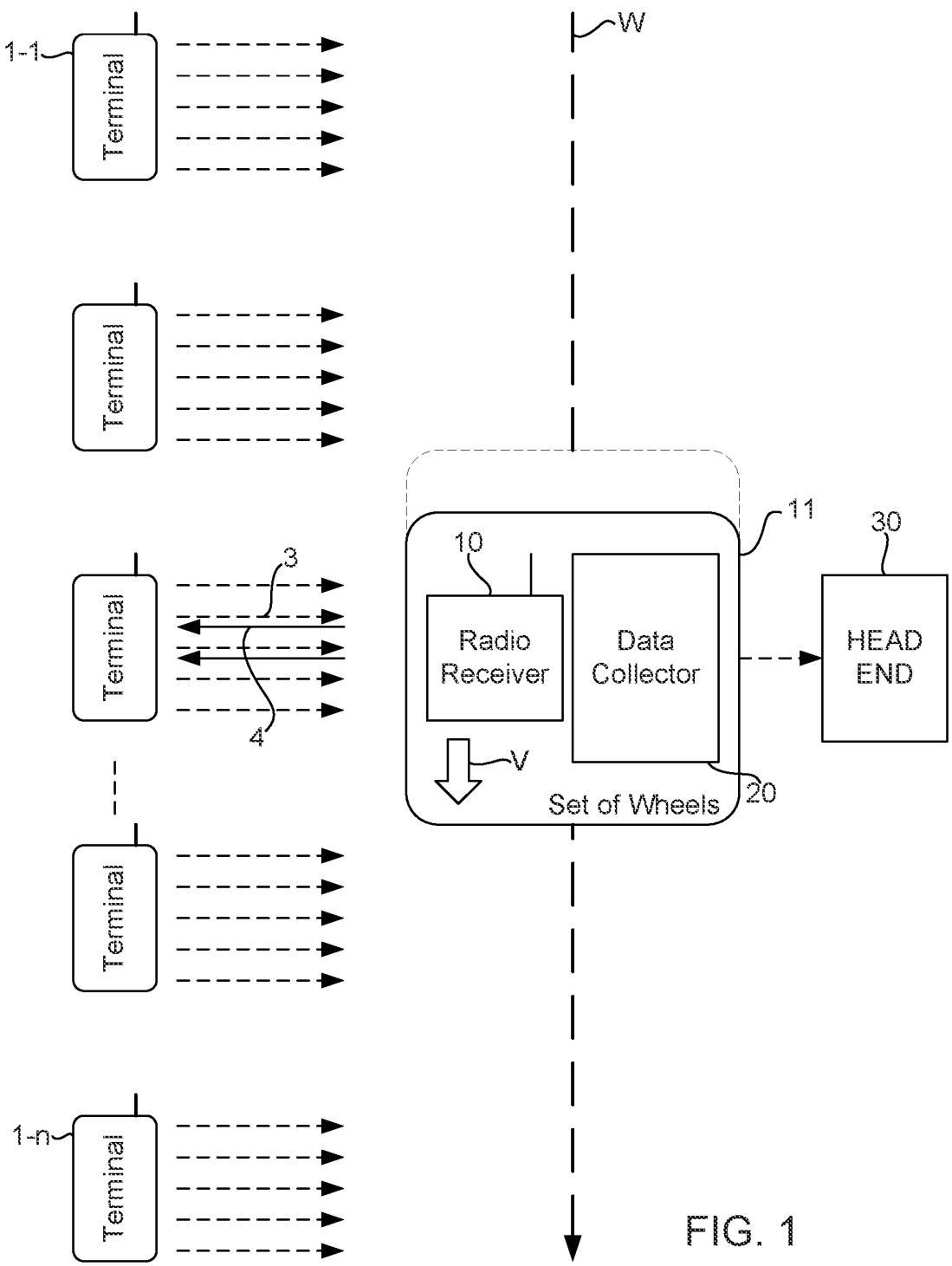
FIG. 1 shows a highly simplified schematic depiction of the reading of terminals by means of a mobile data collector.

Referring now to the figures of the drawing in detail and first, in particular, to FIG. 1 thereof, there is shown a plurality of terminals 1-1, 1-n, which can be meters installed at a fixed location, in particular for water, gas, heat or electricity. The terminals 1-1, 1-n are operated in what is known as the Wireless M-Bus according to EN13757-4. They therefore permit wireless reading, that is to say reading taking place by radio, of their meter readings by means of a data collector 20, which for its part conveys the read data onward to a head end 30. Said data are conveyed to the head end 30 preferably via the WAN network, in particular via the Internet. The meter data are processed further or managed in the head end 30.

The terminals 1-1, 1-n are preferably operated in mode T or C. In these modes, the terminals 1-1, 1-n each transmit a message 3 that is very short, normally 3-8 ms long, in order to allow the meter reading to be read in passing and/or driving by. These messages 3 are sent by the respective terminal 1-1, 1-n continually, for example at intervals of a few seconds, for example at intervals of 8 s (see dashed arrows). When an applicable message 3 is received by the data collector 20, a communication can be set up as a command or a command sequence 4 is transmitted back from the data collector 20 to the relevant terminal 1-1, 1-n. During this communication, the meter data are conveyed to the data collector 20.

The data collector 20 is a mobile data collector that moves past the individual terminals 1-1, 1-n along a route W at a velocity V and is intended to collect the meter readings in driving by. To this end, the data collector 20 is provided with a set of wheels 11. The set of wheels 11 can be a passenger vehicle, HGV or the like. By way of example, an applicable data collector 20 may be accommodated in a vehicle that regularly passes the relevant residential area. Regularly travelling waste disposal vehicles, buses or the like are suitable for this purpose.

The data collector 20 is normally a standard device in the form of a PC, notebook or smartphone.

In addition, a short-range radio receiver 10 is intended to receive the messages 3 of the terminals 1-1, 1-n and to forward them to the data collector 20, or to receive commands and command sequences 4 from the data collector 20 and to transmit these onward to the respective terminal 1-1, 1-n. The short-range radio receiver 10 is able to receive the messages 3 from the terminal 1-1, 1-n in the ms range, subject to a real-time requirement, i.e. with precise timing, and to send commands and command sequences 4 to the terminal 1-1, 1-n accordingly.

To this end, the respective terminal 1-1, 1-n needs to have not only a communication module for Wireless M-Bus but also an appropriate short-range radio module 12.

Figure 2:
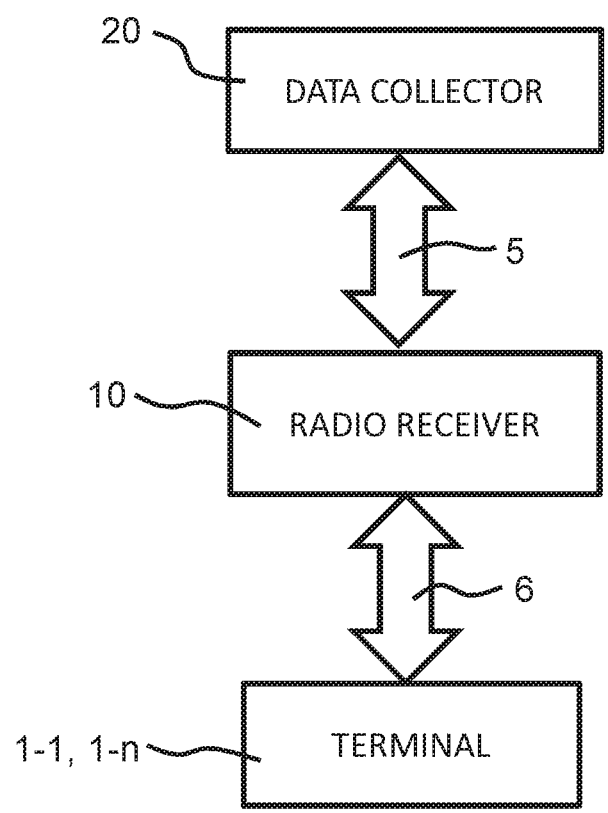
FIG. 2 shows a highly simplified schematic depiction of the interfaces between terminal, short-range radio receiver and data collector according to the present invention.

FIG. 2 shows a schematic of an exemplary communication structure. There is provision between the data collector 20 and the short-range radio receiver 10 for a bidirectional short-range radio interface 5. There is provision between the short-range radio receiver 10 and the respective terminal 1-1, 1-n for a bidirectional primary interface 6 or short-range radio interface.

Figure 3:
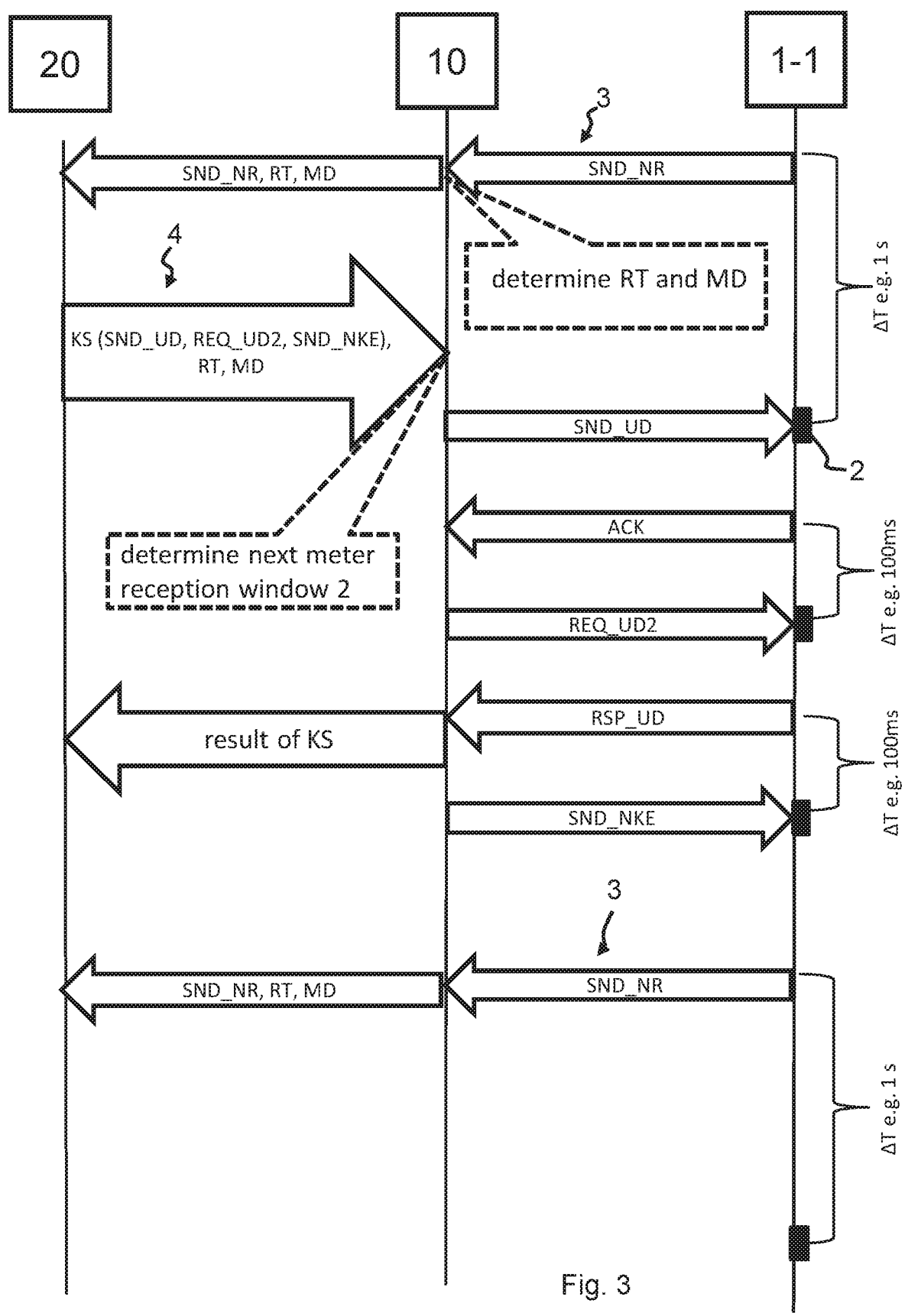
FIG. 3 shows a first refinement of the method according to the invention for setting up communication from a moving data collector via a short-range radio receiver to a terminal installed at a fixed location.

FIG. 3 shows an example of an expedient refinement of the communication set-up according to the invention on the basis of a data interchange between the terminal 1-1, the short-range radio receiver 10 and the data collector 20 along the time axis (the vertical in FIG. 3). The message 3 in FIG. 3 is a message sent periodically, unprompted, by the terminal 1-1 (message SND_NR). This message is received by the short-range radio receiver 10, the reception time RT and preferably also the meta data MD being determined by the short-range radio receiver 10 and immediately being transmitted onward to the data collector 20.

The meta data MD are in particular the signal strength, the transmission mode (T mode or C mode or submode thereof), the frame format (M-Bus frame format: A or B) and/or the command validity period.

The data collector 20 subsequently checks whether there is a command or a command sequence 4 for the terminal 1-1 in its buffer. The data collector 20 then produces the data that are needed for performing the command or the command sequence 4 (e.g. application data, encryption of the data on the application layer or transport layer) and sends said data as a command sequence KS to the short-range radio receiver 10.

The command sequence 4 depicted in FIG. 3 is the commands SND_UD, REQ_UD2, SND_NKE, including the reception time RT and the meta data MD. The commands of the command sequence 4 are standardized commands from EN13757-4. Accordingly, the time RT of reception of the message 3 and the meta data MD are transmitted back to the short-range radio receiver 10 together with the command sequence 4. It is now possible for the short-range radio receiver 10 to determine the occasion of the next reception window 2 of the terminal 1-1, which window, in FIG. 1, is opened in a period of time ΔT of e.g. 1 s after the message 3 is sent, from the available data. The short-range radio receiver 10 is therefore able to transmit the command SND_UD (Send User Data) to the terminal 1-1 within the reception window 2 with precise timing.

Furthermore, the short-range radio receiver 10 is able to determine the next reception window 2 of the terminal 1-1 on the basis of the data available to it. When the short-range radio receiver 10 receives the acknowledgement (ACK) from the terminal 1-1, therefore, it conveys the command REQ_UD2 in the next reception window 2, and the terminal 1-1 then responds with the message RSP_UD and the meter data (frames) are transmitted. The short-range radio receiver 10 transmits the meter data (frames) and the result of the command structure (KS) to the data collector 20. The command SND_NKE terminates the communication between the terminal 1-1, 1-n and the data collector.

In an alternative refinement, it is also possible for the occasion of the respective reception window 2 to be determined in the data collector 20 on the basis of the reception time RT and for this information to be returned to the short-range radio receiver 10, so that the latter receives the information indicating precisely when it needs to send off the respective command.

After the command SND_UD, the determination of the occasion of the first reception window 2 is taken as a basis for the terminal 1-1 to switch from a slow-response delay mode (formation of the reception window after ΔT e.g. 1 s) to what is known as the fast-response delay mode (formation of a reception window after ΔT e.g. 100 ms). In the process example shown in FIG. 3, the short-range radio receiver 10 is able to send the command REQ_UD2 for the first reception window 2 in the fast-response delay mode.

After the reception of the last command SND_NKE within the reception window 2 in the fast-response delay mode, the communication is closed by the command SND_NKE. On the next message 3, the terminal 1-1 changes over to the slow-response delay mode again. The next reception window 2 is therefore again produced within a period of time ΔT of e.g. 1 s after the message 3 is sent.

This allows very rapid set-up of the communication between the terminal 1-1 and the data collector 20 to be ensured.

Figure 4:
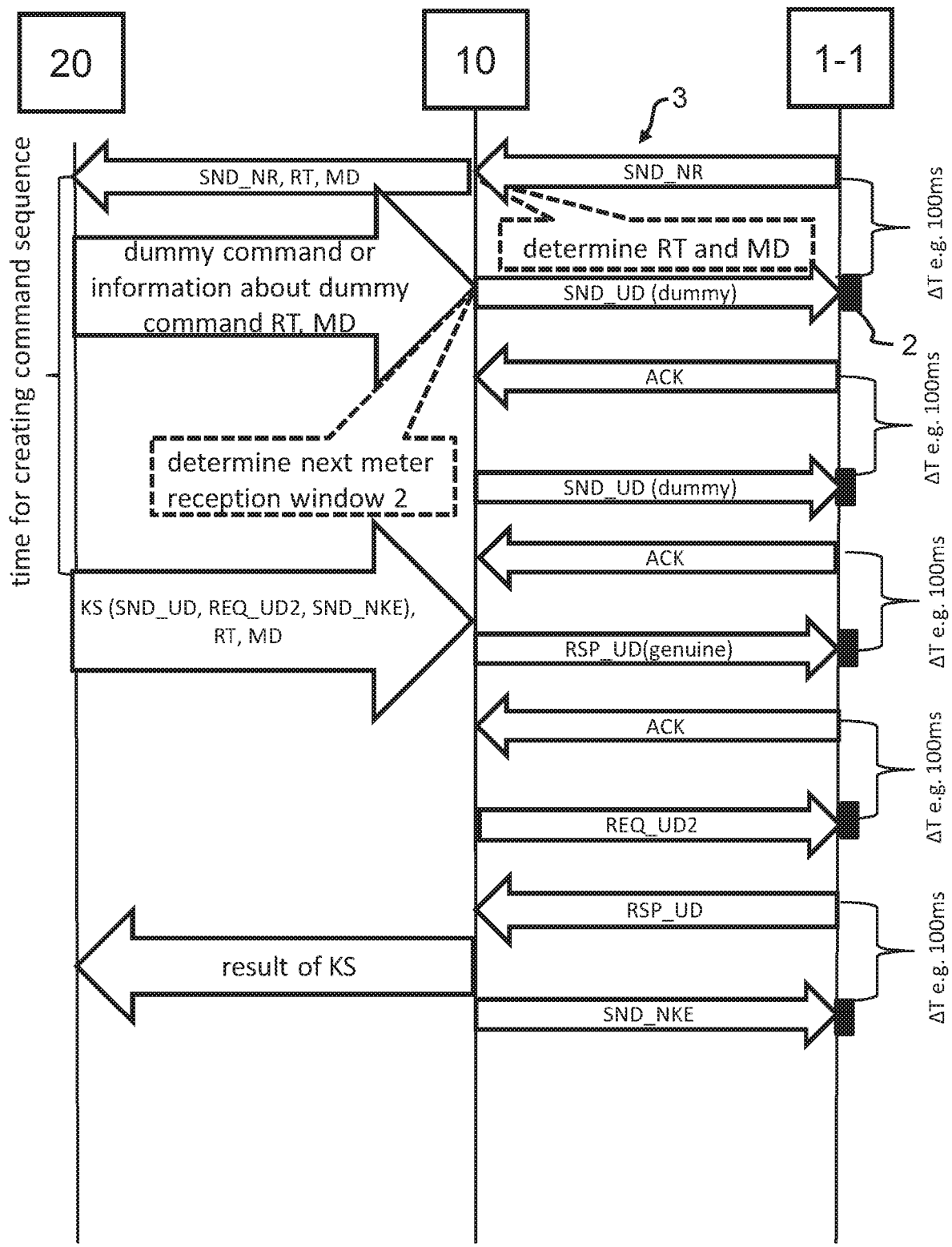
FIG. 4 shows a further refinement of a method for setting up communication from a moving data collector via the short-range radio receiver to a terminal installed at a fixed location.
Figure 5:
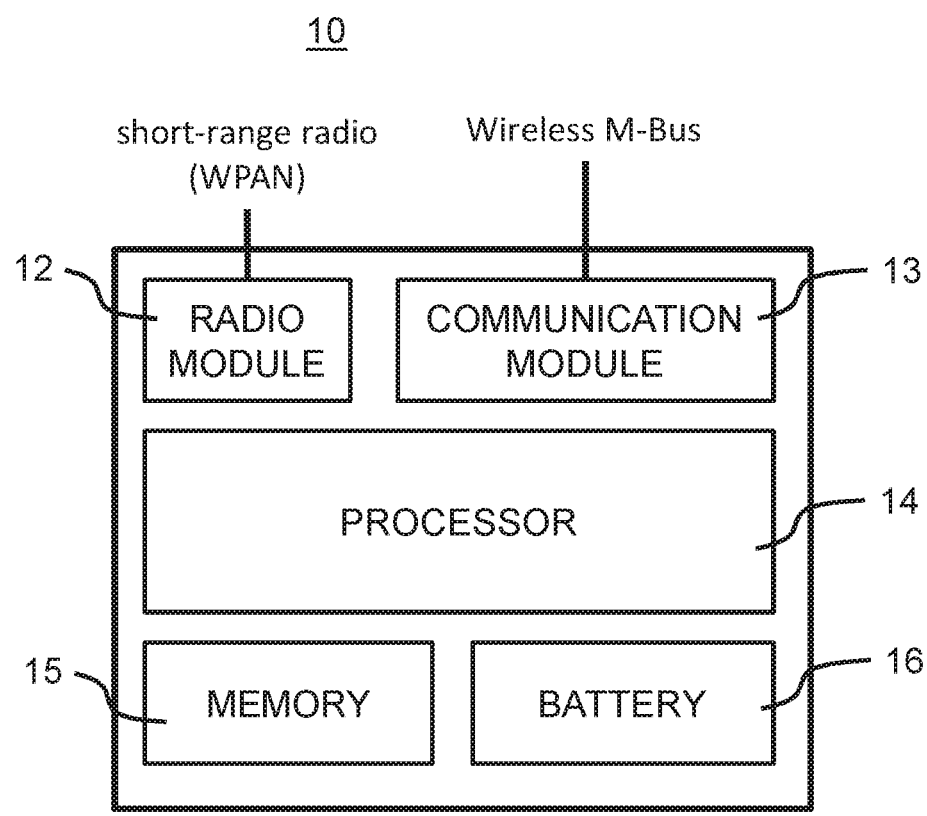
FIG. 5 shows a highly simplified schematic depiction of the short-range radio receiver according to the present invention.

In the case of the exemplary refinement of the method shown in FIG. 4, there is another possible way of setting up the communication according to the invention if the command sequence KS has not yet been created for the first reception window 2. The data collector 20 receives the message 3 together with the reception time RT and the meta data MD and in so doing discovers that the command sequence KS is not yet available for the terminal 1-1, but the reception window 2 after the message 3 is opened very shortly after said message is sent (ΔT e.g. 100 ms).

In this case, the short-range radio receiver 10 initially sends a so-called dummy command (SND_UD(Dummy)) in the first reception window 2 after the message 3. The dummy command is an empty command. The dummy command can be produced in the data collector 20 already and conveyed to the short-range radio receiver 10. Alternatively, instead of the dummy command, just information about the need for a dummy command can be conveyed to the short-range radio receiver 10. The dummy command is used to set up the communication between the short-range radio receiver 10 and the terminal 1-1 as quickly as possible and to use the first reception window 2 therefor. The data collector 20 thereby gains time for producing the genuine command data. The conveyance of a dummy command is continued until the genuine command structure is available and the individual commands can be transmitted in the respective reception windows 2 in accordance with the refinement shown in FIG. 3.

As can be seen from FIGS. 3 and 4, the data collector 20 forwards the commands (e.g. SND_UD, REQ_UD2, SND_NKE) that belong to a command sequence to the short-range radio receiver 10 with a single message. Similarly, the short-range radio receiver 10 forwards commands that belong to a command sequence KS, preferably including the meter data, to the data collector 20 with a single message. This allows a reduced communication via the interface of the short-range radio receiver 10 to be achieved. The short-range radio receiver 10 and the data collector 20 do not need to handle individual commands or the response to a command from an ongoing communication. As a result, the processing in the data collector 20 and in the short-range radio receiver 10 is simpler.

Expediently, a terminal 1-1, 1-n operating e.g. in T2 mode can open its reception window in the slow-response delay mode after e.g. ΔT 1 s and, after sending the message 2, can switch to the fast-response delay mode (e.g. ΔT 100 ms), as can be seen from FIG. 3. The rest of the communication up to the end of the sequence is then performed in the fast-response delay mode. This allows the performance of a command sequence to be speeded up.

The short-range radio receiver 10 is a portable device that has a processor 14, a memory 15 and an autonomous power supply 16, preferably a storage battery or a battery. Furthermore, the short-range radio receiver 10 has a short-range radio module 12, equipped with an antenna, and a communication module 13 for Wireless M-Bus having an antenna. The communication interface between the short-range radio receiver 10 and the data collected 20 may be wired or wireless.

The short-range radio receiver 10 or WPAN receiver is preferably a receiver having a range of approximately 50-100 m. In particular, there may be provision for a Bluetooth® receiver for this purpose. For this case, the interface 5 is equipped as a Bluetooth® interface and the module 12 is equipped as a Bluetooth® module.

The present invention allows effective communication set-up between a data collector 20 and a terminal 1-1, 1-n for a data collector 20 moving past at a velocity of at least 40 km/h, preferably at least 45 km/h, particularly preferably at least 50 km/h.

The present invention therefore ensures significant advantages over the previously existing prior art in regard to the problem of fastest possible communication set-up between a moving data collector 20 and a terminal 1-1, 1-n installed at a fixed location.

It will be understood that various combinations and sub-combinations of features in the described embodiments are expressly also covered by the disclosed content of the invention.

The following is a summary list of reference numerals and the corresponding structure used in the above description of the invention:

1 terminal
2 reception window
3 message
4 command or command sequence
5 short-range radio interface
6 primary interface
10 short-range radio receiver
11 set of wheels 12 short-range radio module
13 communication module for Wireless M-Bus
14 processor
15 memory
16 power supply
20 data collector
30 head end
ΔT period of time
RT reception time
KS command sequence
MD meta data

The invention claimed is:

1. A method for a communication between a terminal installed at a fixed location and a mobile data collector, by using a Wireless M-Bus, via a short-range radio receiver, the method comprising:
   establishing with the short-range radio receiver a bidirectional interface to the terminal, which is situated within a reception range of the receiver, and transmitting data received from the terminal onward to the mobile data collector via a bidirectional short-range radio interface;
   sending a message from the terminal periodically and unprompted for setting up the communication and in each case subsequently opening a reception window after a period of time;
   in response, conveying a command or a command sequence from the mobile data collector to the receiver, receiving the command or the command sequence with the receiver, and conveying the command or the command sequence to the terminal in the reception window;
   determining with the receiver a reception time at which the message arrives at the receiver;
   transmitting the reception time from the receiver onward to the data collector or storing the reception time with the receiver and assigning the reception time on a reception of the command or the command sequence based on an identification;
   taking with the receiver meta data and transmitting the meta data onward to the data collector;
   taking with the receiver or the data collector the reception time and the meta data as a basis for determining a position of the reception window; and
   after having received the command or the command sequence from the data collector, stipulating with the receiver a time at which the command or the command sequence is transmitted onward to the terminal while taking into consideration the reception time, such that the command or the command sequence is received by the terminal within the reception window.

2. The method according to claim 1, wherein the reception from the receiver of the command or the command sequence by the terminal begins with the reception window that is first opened by the terminal for an immediately preceding message, received by the receiver.

3. The method according to claim 1, wherein the meta data are selected from a group consisting of:
   a signal strength;
   a transmission mode;
   a frame format; and
   a command validity period.

4. The method according to claim 3, wherein the meta data include a transmission T mode or C mode, and/or an MS-Bus frame format A or B.

5. The method according to claim 1, further comprising: transmitting the reception time and/or the meta data onward from the receiver to the data collector together with the message.

6. The method according to claim 1, further comprising: initially sending a dummy command from the receiver to the terminal instead of the command or the command sequence during the opening of the reception window.

7. The method according to claim 6, further comprising: repeating a transmission of dummy commands over successively opened reception windows until the command or the command sequence has been produced by the data collector and can be sent over a next reception window.

8. The method according to claim 6, further comprising: producing the dummy command by the data collector and transmitting to the receiver, or receiving by the receiver the message from the data collector and then generating the dummy command.

9. The method according to claim 1, further comprising: conveying from the data collector commands that belong to the command sequence, to the receiver with a single message.

10. The method according to claim 9, further comprising: conveying with the single message the commands that belong to the command sequence together with the reception time and/or the meta data from the data collector to the receiver.

11. The method according to claim 1, further comprising: conveying commands that belong to the command sequence from the receiver to the data collector with a single message.

12. The method according to claim 1, wherein:
   the period of time is switchable such that a first longer period of time or a second shorter period of time is generable in the terminal;
   a reception of a first command by the terminal is followed by a switch from the first longer period of time to the second shorter period of time; and
   effecting a further communication up to an end of the command sequence while retaining the second shorter period of time.

13. The method according to claim 1, wherein the receiver is a WPAN receiver and the terminal is a consumption meter.

14. The method according to claim 13, wherein the receiver is a Bluetooth® receiver.

15. The method according to claim 1, further comprising: effecting a bidirectional communication while the data collector passes the terminal at a velocity of at least 40 km/h, or of at least 45 km/h, or of at least 50 km/h.

16. A short-range radio receiver, comprising:
   a communication module for Wireless M-Bus having an antenna;
   a short-range radio module;
   a processor;
   a memory; and
   a power source;
   the short-range radio receiver being configured to carry out a method for a communication between a terminal installed at a fixed location and a mobile data collector, by using the Wireless M-Bus, via the short-range radio receiver, the method comprising:
   establishing with the short-range radio receiver a bidirectional interface to the terminal, which is situated within a reception range of the receiver, and transmitting data received from the terminal onward to the mobile data collector via a bidirectional short-range radio interface;
   sending a message from the terminal periodically and unprompted for setting up the communication and in each case subsequently opening a reception window after a period of time; in response, conveying a command or a command sequence from the mobile data collector to the receiver, receiving the command or the command sequence with the receiver, and conveying the command or the command sequence to the terminal in the reception window;

determining with the receiver a reception time at which the message arrives at the receiver; transmitting the reception time from the receiver onward to the data collector or storing the reception time with the receiver and assigning the reception time on reception of the command or the command sequence based on an identification;

taking with the receiver meta data and transmitting the meta data onward to the data collector;

taking with the receiver or the data collector the reception time and the meta data as a basis for determining a position of the reception window; and after having received the command or the command sequence from the data collector, stipulating with the receiver a time at which the command or the command sequence is transmitted onward to the terminal while taking into consideration the reception time, such that the command or the command sequence is received by the terminal within the reception window.

* * * * *